United States Patent
Bing et al.

(10) Patent No.: US 7,054,640 B2
(45) Date of Patent: May 30, 2006

(54) METHOD FOR ACCESSING BY STATIONS OF COMMON TRANSMISSION MEDIUM AND NETWORK STATION FOR PERFORMING METHOD

(75) Inventors: Torsten Bing, München (DE); Edgar Bolinth, Mönchengladbach (DE); Arndt Kadelka, Köln (DE); Andreas Krämling, Bonn (DE); Matthias Lott, Neuried (DE); Egon Schulz, München (DE); Bernhard Wegmann, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 140 days.

(21) Appl. No.: 10/475,839

(22) PCT Filed: Apr. 22, 2002

(86) PCT No.: PCT/EP02/04421

§ 371 (c)(1),
(2), (4) Date: Oct. 24, 2003

(87) PCT Pub. No.: WO02/087163

PCT Pub. Date: Oct. 31, 2002

(65) Prior Publication Data

US 2004/0132458 A1     Jul. 8, 2004

(30) Foreign Application Priority Data

Apr. 24, 2001  (DE) ................... 101 20 075
Apr. 24, 2001  (EP) ................... 01109950

(51) Int. Cl.
*H04Q 7/20* (2006.01)
(52) U.S. Cl. .................... 455/452.1; 455/452.2; 455/450

(58) Field of Classification Search .......... 455/452.1, 455/452.2, 450, 434, 509, 516, 166.2, 353, 455/464, 453; 370/329, 342, 431, 443
See application file for complete search history.

(56) References Cited

U.S. PATENT DOCUMENTS

| | | | |
|---|---|---|---|
| 5,280,630 A * | 1/1994 | Wang | 455/452.2 |
| 5,463,629 A * | 10/1995 | Ko | 370/463 |
| 5,471,671 A * | 11/1995 | Wang et al. | 455/226.2 |
| 5,513,379 A * | 4/1996 | Benveniste et al. | 455/451 |
| 5,790,534 A * | 8/1998 | Kokko et al. | 370/335 |
| 5,901,362 A | 5/1999 | Cheung et al. | |
| 5,912,885 A | 6/1999 | Mitts | |
| 6,005,852 A * | 12/1999 | Kokko et al. | 370/329 |
| 6,178,329 B1 * | 1/2001 | Chao et al. | 455/452.1 |
| 6,195,554 B1 * | 2/2001 | H'mimy et al. | 455/450 |
| 6,496,490 B1 * | 12/2002 | Andrews et al. | 370/329 |
| 6,868,277 B1 * | 3/2005 | Cerwall et al. | 455/509 |
| 2003/0162535 A1 * | 8/2003 | Nishiyama et al. | 455/422 |
| 2003/0179731 A1 * | 9/2003 | Noguchi et al. | 370/331 |

FOREIGN PATENT DOCUMENTS

| | | |
|---|---|---|
| EP | 0767548 | 4/1997 |
| GB | 2350026 | 11/2000 |
| WO | 00/60893 | 10/2000 |

* cited by examiner

*Primary Examiner*—Sonny Trinh
(74) *Attorney, Agent, or Firm*—Staas & Halsey LLP

(57) ABSTRACT

Available transfer capacity is apportioned efficiently by stations informing each other of their capacity needs by sending messages when necessary. The sent messages can contain information on priority and capacity requirement. Stations which receive the sent capacity requests release unrequired transfer capacity or transfer capacity which is not urgently required, so that the capacity can by used by a station in need. The corresponding information can also be transferred by other stations, e.g. by several hops.

17 Claims, 3 Drawing Sheets

Step 1:

| Step 1 Channel | Z / AP / APT1 | | | | |
| --- | --- | --- | --- | --- | --- |
| | 1 | 2 | 3 | 4 | 5 |
| 1 | | X | | | |
| 2 | X | | | | |
| 3 | | X | | | |
| 4 | | | X | | |
| 5 | | | | | X |
| 6 | | | | X | |

Table 1

| Step 2 Channel | Z / AP / APT1 | | | | |
| --- | --- | --- | --- | --- | --- |
| | 1 | 2 | 3 | 4 | 5 |
| 1 | | X | | | |
| 2 | X | | | | |
| 3 | | | | | |
| 4 | | | X | | |
| 5 | | | | | X |
| 6 | | | | X | |

Table 2

| Step 3 Channel | Z / AP / APT1 | | | | |
| --- | --- | --- | --- | --- | --- |
| | 1 | 2 | 3 | 4 | 5 |
| 1 | | X | | | |
| 2 | X | | | | |
| 3 | | | X | X | |
| 4 | | | | | |
| 5 | | | | | X |
| 6 | | | | X | |

Table 3

Step 1a:

Step 1b:

METHOD FOR ACCESSING BY STATIONS OF COMMON TRANSMISSION MEDIUM AND NETWORK STATION FOR PERFORMING METHOD

CROSS REFERENCE TO RELATED APPLICATIONS

This application is based on and hereby claims priority to German Application No. 101 20 975.7 filed on Apr. 24, 2001 and European Application No. 01109950.4 filed on Apr. 24, 2001, the contents of which are hereby incorporated by reference.

BACKGROUND OF THE INVENTION

1. Field of the Invention

The invention relates to a method whereby stations may access a common transmission medium, and to a network station for implementing the method.

2. Description of the Related Art

In communication systems such as GSM (Global System for Mobile Communication), UMTS (Universal Mobile Telecommunication System), and HiperLAN (LAN: Local Area Network), mobile stations communicate with network-side stations over radio interfaces. The radio interfaces can here be employed by a plurality of mobile stations in parallel or concurrently. The accessing by stations of a common transmission medium of this type is facilitated by multiple access (MA) systems, whereby a distinction is made as to whether the medium is divided among the stations on a Time Division Multiple Access (TDMA) basis, a Frequency Division Multiple Access (FDMA) basis, a Code Division Multiple Access (CDMA) basis or a Space Division Multiple Access (SDMA) basis. The medium is frequently subdivided into frequency channels and/or time slots, such as in the case of GSM, TETRA (Trans-European Trunked Radio), and DECT (Digital European Cordless Telecommunications). Measurements are employed in the case of systems coordinated on a decentralized basis to determine whether a channel can be used. In keeping with the radio propagation it is possible to re-use a channel, for instance at an appropriate spatial distance.

Future radio systems should be able to support a large number of different services simultaneously. The services differ in having, for example, different transmission requirements in terms of delay or error rate, for instance, and arrival processes. The aim of the carrier is to maintain the quality-of-service agreed during connection setup and to use the available spectrum as efficiently as possible.

An occurrence in communication systems coordinated on a decentralized basis whose channel assignment is based on radio channel measurements is for a station to require transmission capacity for a connection but for this transmission capacity to be unavailable, the neighboring stations having occupied this capacity or the relevant channel. As a consequence, either the connect request has to be rejected or the agreed quality-of-service of existing connections cannot be maintained. In communication systems with link adaptation, such as EDGE/EGPRS (Enhanced Data Rates for GSM Evolution/Enhanced General Packet Radio Service), the occupation of a channel by a neighboring station may necessitate a change of modulation/coding, thereby reducing the available data rate and consequently negatively affecting existing connections.

A particular occurrence when connections with different quality-of-service requirements are operated simultaneously is for data services with low-level requirements, such as file transfers (FTP/File Transfer Protocol downloading), to require and occupy more transmission capacity during connection setup than is necessary to maintain the quality-of-service required by the user if this is available at that time, for example if a file transfer is being performed. The relevant capacity will then cease to be available at the neighboring stations and connect requests will have to be rejected.

There is therefore the problem of distributing the existing transmission capacity among radio cells organized on a decentralized basis as efficiently as possible, whereby, on the one hand, the capacity must be utilized as fully as possible even if this results in exceeding the required quality-of-service, and, on the other hand, any non-essential capacity can, if necessary, be made available to other radio cells.

This problem arises in systems in which services with different quality-of-service requirements share the common radio medium and in which use is made of measuring, dynamic channel assignment organized on a decentralized basis. The specific type of channel, such as time slot and/or frequency channel, is basically not of crucial significance here. There are currently various systems of this type:

In the IEEE 802.11 standard there is a mode controlled on a centralized and a decentralized basis. In the case of decentralized control (Distributed Coordination Function (DCF)), all stations are peer entities and service prioritizing is not supported. In the case of centralized control (Point Coordination Function (PCF)), accessing by the individual stations in a radio cell is controlled by a central station serving as the access point (AP), with several access points being connected via a distributed system (DS). The problem described will not be resolved if the access points are unable to communicate with each other, for example if the central controller (PCF) is used by a station without access to a distribution system (DS) in order to support a specific quality-of-service in an ad hoc mode. With decentralized access, the transmission of a single packet could be controlled by a priority specified according to, among other things, the requirements of the quality-of-service. However, this is currently not supported by the standard.

In the HIPERLAN/2 system for data networks currently being standardized, a base station (Access Point (AP)) manages the access to the common medium by the cordless stations (Wireless Terminal, WT) registered with it. Several base stations can be coordinated by a higher-order instance (Access Point Controller (APC)). The standard only allows for central administration of the transmission capacity within the area of an access point. If an access point does not have a connection to the fixed network, the access point is referred to as a central controller (CC).

SUMMARY OF THE INVENTION

An object of the invention is to distribute the existing transmission capacity as efficiently as possible with a method for the accessing by stations of a common transmission—medium by a multiple access system, or to propose a station for implementing the method.

This object is achieved by a method whereby stations access a common transmission medium, and by a station with features for implementing the method.

Stations sharing a common transmission medium with other stations advantageously inform these, when required, about their capacity requirements by sending messages over the radio interface or over, in H2GF for example, defined interfaces between the network-side stations or access points. The messages that are sent can contain information about the priority and the capacity needs. Stations receiving the sent capacity requests release any transmission capacity that is not needed, or not urgently needed, so that this can be used by the needy station. The relevant information can also be forwarded via other stations over several "hops", for instance.

A method that is also particularly advantageous is one whereby the information is exchanged by an easily detectable signal, in particular an energy pulse. The easily detectable signal can to practical effect be evaluated by other systems, in particular with a different coding system, different code, different modulation system, different bandwidth and/or different frequency band. It is also possible here to use discriminating variables with the aid of which stations of different carriers are distinguished.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
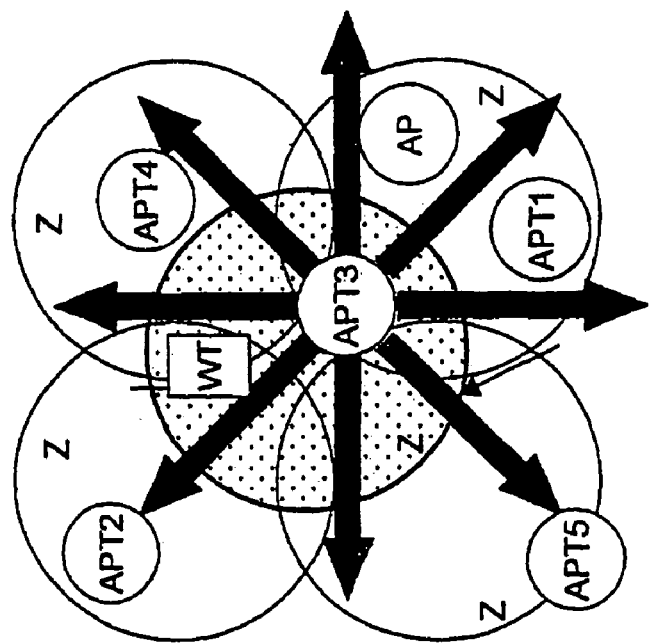
FIG. 1 is a schematic representation of an arrangement of radio cells in which stations share a common transmission medium according to a first exemplary embodiment.

Reference will now be made in detail to the preferred embodiments of the present invention, examples of which are illustrated in the accompanying drawings, wherein like reference numerals refer to like elements throughout.

As can be seen in FIG. 1, an exemplary radio communication system may have one or, as shown here, several radio cells Z advantageously partially overlapping. Within these radio cells Z, on the network-side there is in each case a base station or access point AP coordinating the radio traffic within the relevant radio cell Z. The radio interface between the network-side stations AP, APT, and stationary or mobile stations or, as the case may be, wirelessly linked terminals WT of a user is set up via transmit and receive equipment. This transmit and receive equipment is a constituent part of the base stations or access points AP or is linked to these. It can in particular also be a constituent part of access point terminals APTi, APTj, APTk with (i, j, k=1, 2, 3 . . . ), several of which can be located in a cell Z or group of cells Z as substations of the access points AP.

In the exemplary embodiments a central network-side station, such as the access station AP, coordinates transmission in its vicinity or in its area of influence by assigning transmission capacity for example to the stationary or mobile stations or, as the case may be, terminals WT served by it. If the central network-side station AP requires more transmission capacity than it momentarily occupies and no free channels are available, it will inform the network-side stations APi, APj, APk (i, j, k=1, 2, 3, . . . ) in its vicinity about the shortage of transmission capacity by sending a relevant message over the radio interface.

This message can be transmitted in such a way as to be easily detectable, for example in the form of a synchronizing sequence, and/or allow conclusions to be drawn concerning the priority of the requirements and the required transmission capacity. Simple messages thus require no decoding but only have to be detected. The message can also contain additional parameters, in that case requiring decoding at the receiving station.

Other network-side stations Api, Apj, APk, in particular central stations, which receive this message will release any non-urgently required transmission capacity, which is to say in particular channels, used for services with low-level requirements, for example for what are called "best effort" services, or will, where applicable, switch to another channel so that this is available to the needy station AP.

To increase the range of the message, according to a particularly preferred embodiment this can also be forwarded from other stations, such as from radio-controlled network-side or mobile terminals WTs served by the central station AP.

In the first exemplary embodiment, as can be seen from Table 1 in FIG. 1, in the currently standardized radio access system HIPERLAN/2 (H/2) the radio resources are assigned to the network-side base stations or access points AP in the form of frequency channels 1–6. An access point AP may have one or more transmit units APT (Access Point Transceiver) and a controller APC (Access Point Controller). The assignment can analogously also be made to cells Z or access point terminals APT. The channel assignment can be coordinated centrally within the area of a network-side controller APC. Communication for coordinating the frequency assignment is currently not provided between different APCs.

Each transmit unit or, as the case may be, each access point APT employs dynamic frequency selection (DFS) to occupy a frequency channel having maximum reutilization spacing in order to achieve low-level interference power.

Capacity meeting present requirements is assigned to users dynamically by allocating time slots within the media access control (MAC) frame. So that the necessary quality-of-service can also be maintained in unfavorable transmission conditions, use is made of, for example, adaptive modulation/coding, known in its own right as, for example, 'link adaptation'. This means that higher-level coding and/or lower-value modulation is used if channel characteristics are relatively poor, although the available data rate will be reduced as a result. To increase the available data rate, the interference of the radio channel has to be reduced.

If the affected access point AP is unable to switch to another frequency channel, a message will be transmitted to the cells with the same used channel or, as the case may be, co-channel cells, with the message indicating the shortage of capacity. For the access points AP receiving this message there are various possibilities for supporting the affected access point AP.

Switching to another frequency channel is a first possibility. As the interference is reduced, the affected access point AP can use higher-value modulation.

It is also possible to reduce transmissions to what is necessary in order to comply with the service agreements, for example the so-called Quality-of-Service (QoS). Where applicable, it is also possible to switch to a lower-rate physical operating mode (PHY mode), thereby reducing the transmit power. The data rate can also be increased when use is made of suitable algorithms for link adaptation.

According to another embodiment, neighboring base stations can be induced to release occupied channels in the case of systems which generate channels through a combination of frequency division and time division multiple access (FDMA/TDMA) and in which channel capacity is assigned by occupying/releasing individual channels.

Figure 3:
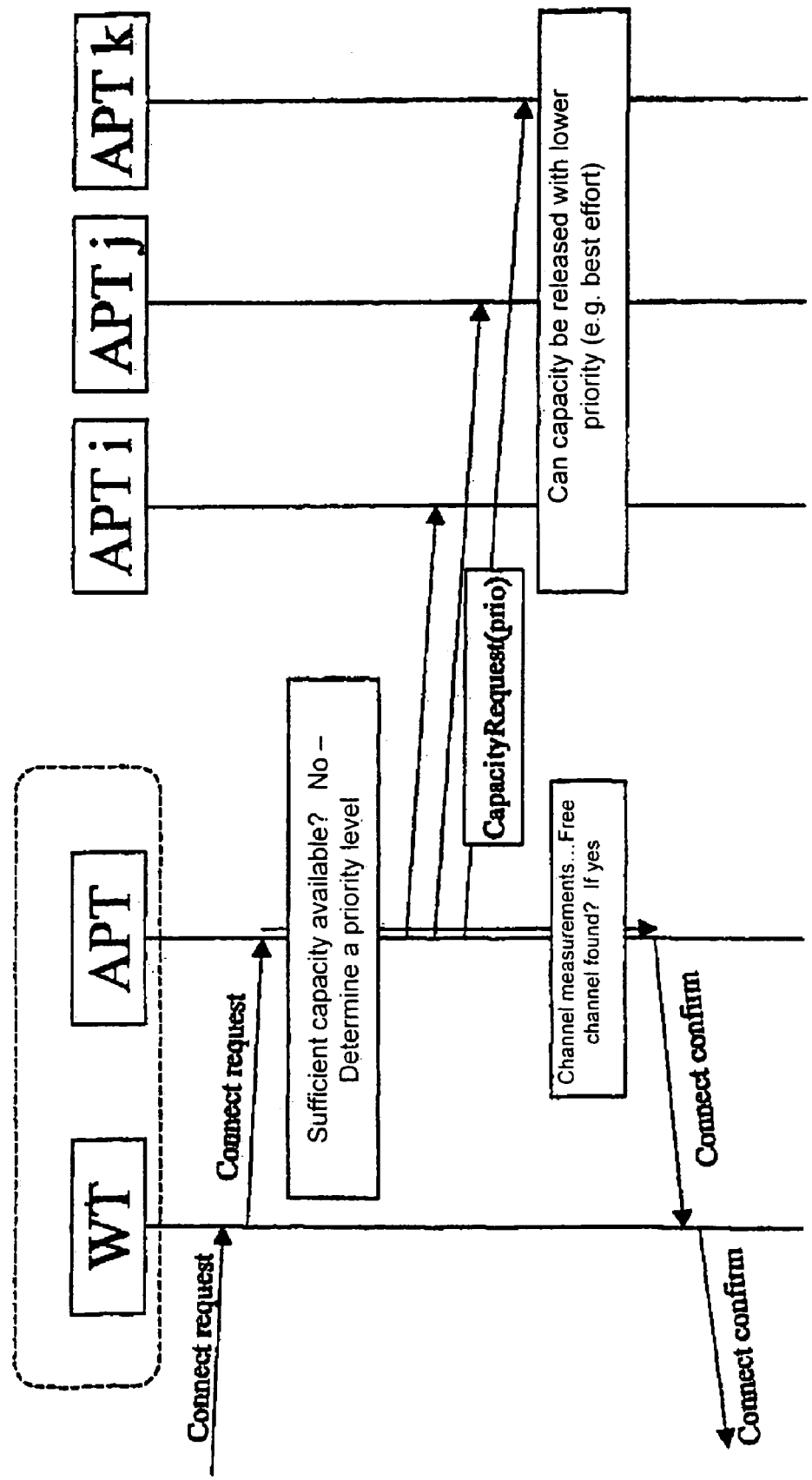
FIG. 3 is a schematic diagram for clarifying an exemplary flow.

A first embodiment is shown in FIG. 1, the flow being apparent from FIG. 3. After a connect request from the user, the user's station WT requests a channel for additional transmission capacity from the access point terminal APT3 with which it is communicating. However, there is no channel here, for instance, that can be freely occupied because all channels have been assigned to specific base stations or, as the case may be, access points or cells, as can also be seen from Table 1 in FIG. 1.

It is determined on the network side whether there is sufficient transmission capacity to assign a suitable channel to the requesting station WT This not being the case here, the access point terminal APT3 sends a capacity request (Capacity request(prio)) to the neighboring access point terminals APTi, APTj, APTk (i=1, 2, 4, 5). The capacity request (Capacity request(prio)) advantageously also contains priority details, 'prio', enabling the receiving access point terminal APTi, APTj, APTk to determine the urgency or the quality-of-service of the request.

It is then determined in the receiving access point terminals APTi, APTj, APTk whether these are able to release suitable transmission capacity. If they can, for example in the case of access point terminal APT2, this will be done, channel 3, for example, being released here as shown in Table 2 in FIG. 1.

The access point terminal APT3 requesting transmission capacity or, as the case may be, access point AP continuously monitors the capacity status on the radio interface. As soon as it finds a free channel, or one that has become free, in this case channel 3, which meets the required conditions, it sends a connect confirm signal to the requesting station WT. This confirms the connection capability, in turn, of the requesting function or equipment. The channel 3 that has become free is thus occupied by the access point terminal APT3, as shown in Table 3 in FIG. 1.

A corresponding notification about release and/or non-release can also optionally be sent by the access point terminals APTi, APTj, APTk to the inquiring access point terminal APT. This will then not have to continuously monitor the radio interface.

Figure 2:
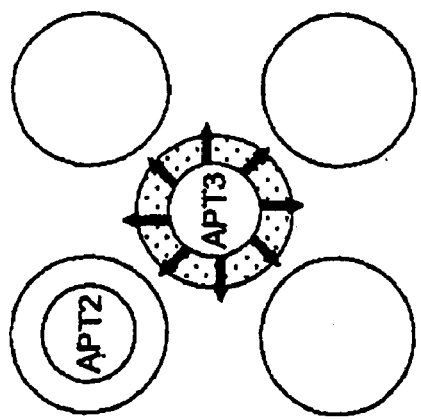
FIG. 2 is a schematic representation of an arrangement according to a second exemplary embodiment.
Figure 2:
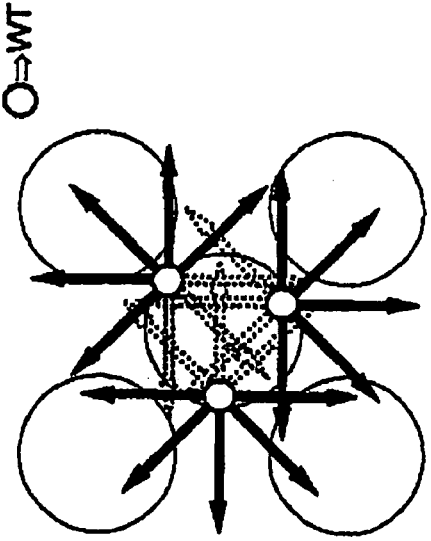

FIG. 2 shows an embodiment in which forwarding takes place. However, none of the other access point terminals APTi respond to the request for transmission capacity from the access point terminal APT3—at 1a—because the cells Z do not overlap to a sufficient extent.

Later at 1b, the information is consequently forwarded from the stationary and mobile stations or, as the case may be, terminals WT, which are located in the corresponding area and which are outlined in the lower picture in FIG. 2 as circles in the edge region of the cell. In the present example in Table 2 in FIG. 2, the access point terminal APT2 can release transmission capacity in response to the request: channel 3, for instance. The base station or, as the case may be, the access point terminal APT3 originally requesting capacity recognizes this and re-occupies, according to Table 3 in FIG. 2, channel 3 as in the preceding exemplary embodiment.

Both embodiments thus permit variable channel assignment whereby use of the same channel by two neighboring cells or base stations is avoided and optimized utilization of the available channels nonetheless facilitated.

The invention has been described in detail with particular reference to preferred embodiments thereof and examples, but it will be understood that variations and modifications can be effected within the spirit and scope of the invention.

The invention claimed is:

1. A method for accessing by stations sharing a common transmission medium in a radio communication system with other stations, comprising:
sending a capacity request with capacity requirements from a capacity-requesting station to at least one neighboring station outside a local cell of the capacity-requesting station, when additional capacity is required by the capacity-requesting station depending on a choice of different services with different quality-of-service requirements shared by the common transmission medium.

2. A method according to claim 1, wherein the at least one neighboring station is at least one of a user-side station and a network-side station.

3. A method according to claim 2, further comprising releasing a transmission channel by a releasing station having releasable capacity in response to receipt of the at least one item of information.

4. A method according to claim 3, further comprising at least one of continuously monitoring capacity status on the common transmission medium and receiving notification of capacity release from the releasing station, by the capacity-requesting station.

5. A method according to claim 4, wherein the information includes a capacity request.

6. A method according to claim 5, wherein the information also includes priority information.

7. A method according to claim 6, further comprising forwarding the capacity request by the at least one neighboring station to at least one of the other stations.

8. A method according to claim 1, further comprising utilizing measurements of dynamic channel assignment organized on a decentralized basis to determine what channels can be used.

9. A station for accessing a common transmission medium in a radio communication system shared with other stations, comprising:
a transmission unit to send a capacity request with capacity requirements from said station to at least one neighboring station outside a local cell of said station, when additional capacity is required by said station depending on a choice of different services with different quality-of-service requirements shared by the common transmission medium.

10. A station according to claim 9, wherein the at least one neighboring station is at least one of a user-side station and a network-side station.

11. A station according to claim 10, wherein said transmission unit further transmits a release of a transmission channel in response to receipt of a capacity request from one of the other stations when said station has releasable capacity.

12. A station according to claim 11, further comprising at least one of a monitoring unit to continuously monitor capacity status on the common transmission medium and a receiving unit to receive notification of capacity release.

13. A station according to claim 12, wherein the information includes a capacity request.

14. A station according to claim 13, wherein the information also includes priority information.

15. A station according to claim 10, further comprising a processor utilizing measurements of dynamic channel assignments organized on a decentralized basis to determine what channels can be used.

16. A station according to claim 10, wherein said transmission unit further forwards a capacity request by a first one of the other stations to at least one of the other stations.

17. A station according to claim 9, wherein the capacity request depends on the choice of different services with different quality-of-service requirements for which use is made of measuring dynamic channel assignment organized on a decentralized basis.

* * * * *